(12) United States Patent
Jamison

(10) Patent No.: US 11,359,447 B1
(45) Date of Patent: Jun. 14, 2022

(54) METHOD TO PERFORM BACKGROUND LCM TREATMENTS

(71) Applicant: Halliburton Energy Services, Inc., Houston, TX (US)

(72) Inventor: Dale E. Jamison, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/546,881

(22) Filed: Dec. 9, 2021

(51) Int. Cl.
*E21B 21/06* (2006.01)
*E21B 21/08* (2006.01)

(52) U.S. Cl.
CPC .......... *E21B 21/065* (2013.01); *E21B 21/068* (2013.01); *E21B 21/08* (2013.01)

(58) Field of Classification Search
CPC ....... E21B 21/08; E21B 21/065; E21B 21/066
See application file for complete search history.

(56) References Cited

U.S. PATENT DOCUMENTS

| | | | | |
|---|---|---|---|---|
| 2,919,898 | A * | 1/1960 | Marwil | E21B 21/065 210/197 |
| 4,247,312 | A * | 1/1981 | Thakur | B01D 21/12 210/522 |
| 7,908,034 | B2 * | 3/2011 | Gray | E21B 21/08 175/48 |
| 10,227,521 | B2 | 3/2019 | Jamison et al. | |
| 2005/0204961 | A1 * | 9/2005 | Chatterji | C04B 28/02 106/724 |
| 2006/0096759 | A1 * | 5/2006 | Reddy | C09K 8/516 166/295 |
| 2009/0145664 | A1 * | 6/2009 | Larson | E21B 21/063 175/65 |
| 2009/0308611 | A1 * | 12/2009 | Santra | C09K 8/032 507/202 |
| 2011/0278006 | A1 * | 11/2011 | Sanders | C09K 8/32 507/224 |
| 2014/0353042 | A1 * | 12/2014 | Karale | C09K 8/725 175/64 |
| 2016/0237768 | A1 * | 8/2016 | Jamison | E21B 21/06 |

* cited by examiner

*Primary Examiner* — Shane Bomar
(74) *Attorney, Agent, or Firm* — Conley Rose, P.C.; Rodney B. Carroll

(57) ABSTRACT

A method including circulating wellbore servicing fluid (WSF) downhole, passing the circulating WSF through a separator configured to separate solids therefrom, separating the plurality of particles into screened particles having a diameter greater than or equal to a mesh size and retained particles having a diameter less than the mesh size in a particulate-reduced WSF, adding a volume of second loss circulation material (LCM) composition including replenishment particles to particulate-reduced WSF to provide LCM-adjusted WSF, and introducing LCM-adjusted WSF downhole and circulating LCM-adjusted WSF. The WSF includes first LCM composition including plurality of particles having first cumulative particle size distribution (PSD). The LCM-adjusted WSF includes LCM-adjusted WSF LCMs. LCM-adjusted WSF LCMs include the retained and replenishment particles. The second LCM composition is selected to minimize a difference between a cumulative PSD of the LCM-adjusted WSF LCMs and first cumulative PSD and also minimize mass and/or volume of second LCM composition.

20 Claims, 5 Drawing Sheets

METHOD TO PERFORM BACKGROUND LCM TREATMENTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to systems and methods of performing background treatments. More specifically, this disclosure relates to monitoring and controlling background treatments. Still more specifically, this disclosure relates to monitoring and controlling background treatments by utilizing a model that minimizes a mass and/or volume of an LCM composition added to a particulate-reduced wellbore servicing fluid (WSF) produced by removing solids from a circulating WSF and also minimizes a difference between a cumulative particle size distribution (PSD) of the circulating WSF and an LCM-adjusted WSF formed by combining the particulate-reduced WSF and the LCM composition.

BACKGROUND

Natural resources (e.g., oil or gas) residing in a subterranean formation can be recovered by driving resources from the formation into a wellbore using, for example, a pressure gradient that exists between the formation and the wellbore, the force of gravity, displacement of the resources from the formation using a pump or the force of another fluid injected into the well or an adjacent well. A number of wellbore servicing fluids can be utilized during the formation and production from such wellbores. For example, in embodiments, a drilling fluid can be utilized to cool a drill bit and remove cuttings during the drilling of the wellbore, or the production of fluid in the formation can be increased by hydraulically fracturing the formation with a fracturing fluid. That is, a treatment fluid (e.g., a fracturing fluid) can be pumped down the wellbore to the formation at a rate and a pressure sufficient to form fractures that extend into the formation, providing additional pathways through which the oil or gas can flow to the well. Subsequently, oil or gas residing in the subterranean formation can be recovered or "produced" from the well by driving the fluid into the well. Oil and gas wells produce oil, gas, and/or byproducts from subterranean formation hydrocarbon reservoirs. A variety of subterranean formation operations are utilized to obtain such hydrocarbons, such as drilling operations, completion operations, stimulation operations, production operations, enhanced recovery operations, and the like.

During background operations at a wellsite, wellbore servicing fluids (WSFs) including loss circulation materials (LCMs) can be employed. When such WSFs are circulated from through a wellbore, solids can be removed, thus providing a particle-reduced WSF produced via the separating of screened particles from the circulated WSF. The particulate-reduced WSF can thus have a particle size distribution (PSD) of LCMs that is different from an initial formulated or desired cumulative PSD of the LCMs in the WSF introduced into the wellbore. Maintaining or controlling a desired cumulative PSD and volume of the circulating WSF can thus be challenging due to separating out of larger solids during solids removal.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
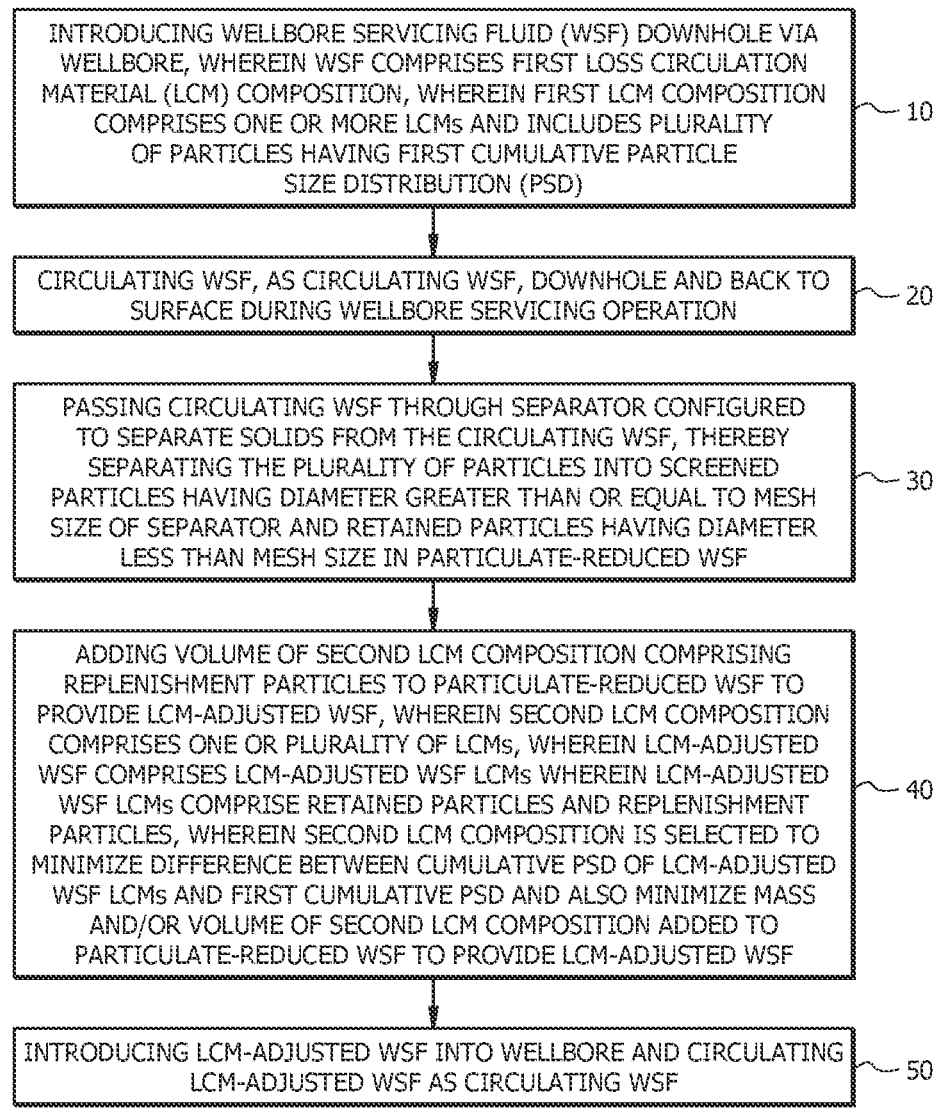
FIG. 1 is a schematic flow diagram of a method, according to one or more embodiments of this disclosure.

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

Managing the additions of LCM materials (also referred to as maintaining or controlling a desired or target amount of LCM materials) that are typically used in background treatments can be challenging due to the difficulty of replenishing LCM materials that are removed by solids removal apparatus (e.g., shaker screens) without adding materials that will pass through the shaker screen that can thus build up in the wellbore servicing fluid (WSF) with each addition (or "replenishment"). The solids removal apparatus can include, for example, shaker screens designed primarily to remove wellbore debris and cuttings from a circulating wellbore servicing fluid or "mud".

LCM materials having a size larger than a separator mesh size (e.g., shaker screen size) can be added to a drilling fluid when operations such as wellbore strengthening are anticipated. Such materials can be added as "insurance" to deal with unexpected natural fractures, loosely consolidated bedding planes, and natural small vugs that can cause lost circulation events. Such "background treatments" can be employed to mitigate any drilling fluid loss to the formation.

Herein disclosed are a system and method that employ a model to predict a number of background LCM replenishments that can be made before the mud weight of the fluid system exceeds its bounds, either too high or too low for proper ECD (equivalent circulating density) guidelines.

In embodiments, the system and method of this disclosure can utilize a model that enables continuous (or intermittent) LCM additions to a mud system to improve ECD management, especially in narrow margin wells. A dilution schedule and/or a weight up schedule can be utilized along with the replenishments (e.g., addition of "replenishment particles", as detailed hereinbelow) to maintain a desired ECD.

Conventionally, the same LCM products utilized in the initial WSF are employed as replenishment materials, and the mass required can be very large. Via the model described herein, only or substantially primarily the materials that are removed by the solids removal apparatus (e.g., shaker screen) can be replaced, thus minimizing a build-up of "small" solids that pass through the separator (e.g., the mesh or screen of the separator). That is, by adding back a minimal amount of LCM materials that are not removed by the separator with each pass there-through, a buildup of such small particles can be minimized via the system and method of this disclosure.

Typically, the available LCM materials at a jobsite (e.g., a wellsite) have a particle size distribution that includes particles greater than and or equal to a mesh size of the separator being employed and particles having a particle size less than the mesh size. Accordingly, it is not usually possible to add back only LCM particles that are removed by the solids removal separator. The system and method of this disclosure can employ a strategy or model that (e.g., iteratively) selects a best combination of available LCM materials (each of the available LCM materials or compositions having a particular cumulative PSD associated therewith) to minimize a buildup of particles having a size less than the mesh size of the separator, while as closely as possible approximating the desired cumulative particle size distribution of the circulating WSF (i.e., minimizing a difference between a PSD of the circulating WSF and an LCM-adjusted WSF including the particulate-reduced WSF and replenishment particles of an LCM composition added thereto to make up for LCM particles removed via the separator).

Accordingly, the system and method of this disclosure can provide for superior management of background treatments relative to systems and methods that simply add back to the particulate-reduced WSF obtained from the separator an LCM composition originally utilized to form the circulating WSF (i.e., methods that add back substantial amounts of small particles that are retained by the separator, thus resulting in a substantial buildup of such particles having a size less than the mesh or cutoff size of the separator).

A method according to embodiments of this disclosure will now be described with reference to FIG. 1, which is a schematic flow diagram of a method, according to one or more embodiments of this disclosure, FIG. 2, which is a schematic flow diagram of a method, according to one or more embodiments of this disclosure, FIG. 3, which is a depiction of replacing particles screened from a drilling fluid, according to embodiments of this disclosure, and FIG. 4, which is a schematic of a system, according to one or more embodiments of the this disclosure.

Figure 3:
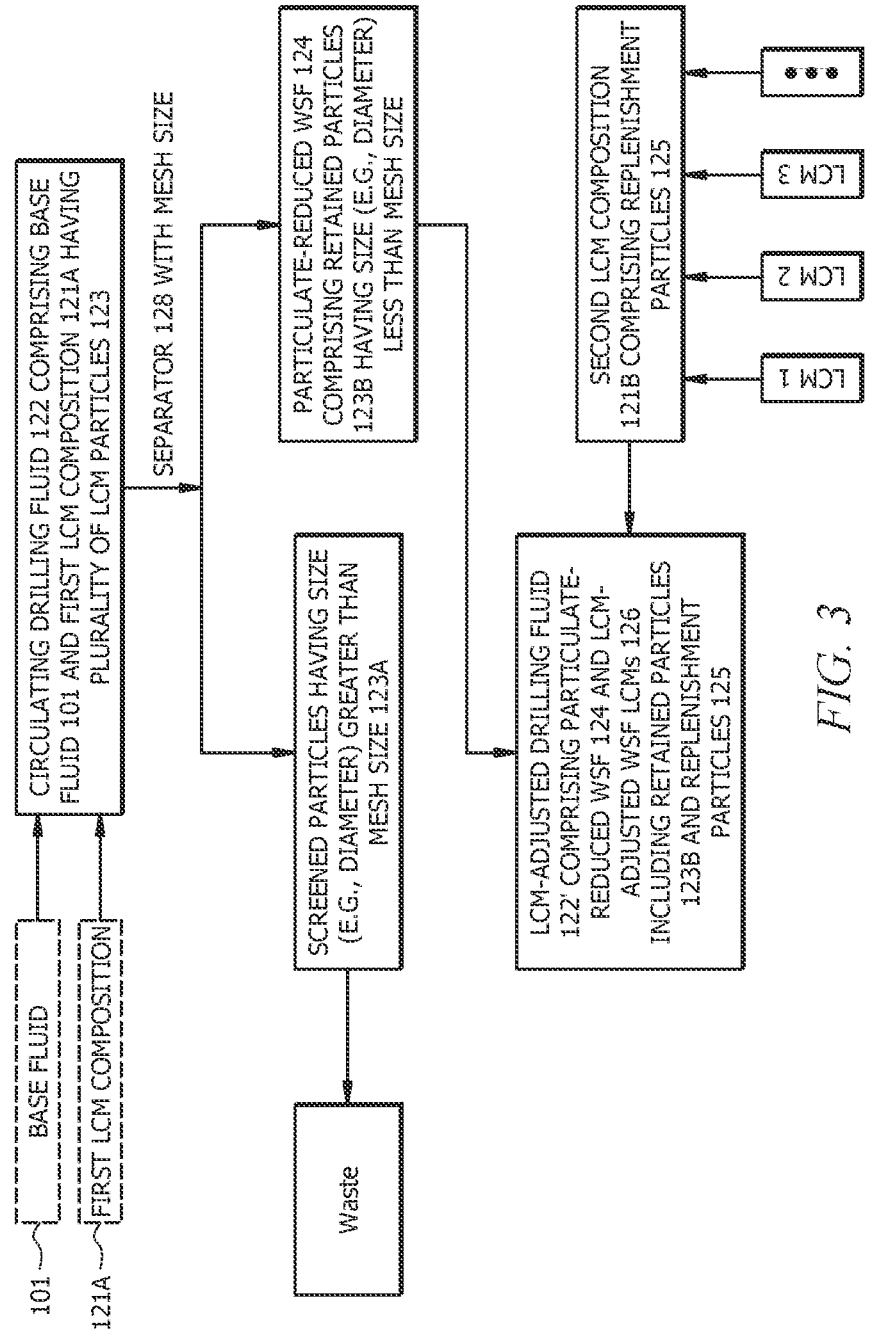
FIG. 3 is a depiction of replacing particles screened from a drilling fluid, according to one or more embodiments of this disclosure.

As depicted in FIG. 1, which is a schematic flow diagram of a method I, according to one or more embodiments of this disclosure and FIG. 3, which is a depiction of replacing particles screened from a drilling fluid, according to embodiments of this disclosure, a method I of this disclosure can include, at 10, introducing a wellbore servicing fluid (WSF) (122, FIG. 3 and FIG. 4, described further hereinbelow) including a first loss circulation material (LCM) composition 121A downhole via a wellbore (116, FIG. 4), circulating, at 20, the WSF 122, as a circulating WSF 122, downhole and back to a surface (107, FIG. 4) during a wellbore operation; passing, at 30, the circulating WSF 122 through a separator 128 configured to separate solids from the circulating WSF 122; adding, at 40, a volume of a second LCM composition 122A including replenishment particles 124 to a particulate-reduced WSF produced at 30, to provide an LCM-adjusted WSF; and, at 50, introducing the LCM-adjusted WSF 122' into the wellbore 116 and circulating the LCM-adjusted WSF 122', as the circulating WSF. Passing, at 30, the circulating WSF 122 through separator 128 configured to separate solids from the circulating WSF 122 separates the plurality of particles 123 into screened particles 123A having a diameter greater than or equal to a mesh size X (e.g., greater than or equal to X) of the separator 128 and retained particles 123B having a diameter less than the mesh size (e.g., less than X) in the particulate-reduced WSF 124. The WSF 122 passed through the separator 128 at 30 can include a base fluid 101 and the first loss circulation material (LCM) composition 121A. The first LCM composition 121A at step 10 can include one or more LCMs (e.g., each having a cumulative PSD) and includes, overall, a plurality of particles 123 having a first cumulative particle size distribution. The second LCM composition 121B added at 40 can include one or a plurality of LCMs (e.g., LCM 1, LCM 2, LCM 3, and so on). The one or the plurality of LCMs can be LCMs available at the wellsite 136, and can each have a particular cumulative PSD. The LCM-adjusted WSF 122' produced at 40 includes LCM-adjusted WSF LCMs 126; the LCM-adjusted WSF LCMs 126 include the retained particles 123B and the replenishment particles 125 of second LCM composition 121B. As utilized herein, "retained" particles are those particles retained in the fluid passing through separator 128, while "screened" particles are those separated out by separator 128. As depicted in FIG. 3, the screened particles can be sent to waste.

The second LCM composition 121B is selected to minimize a difference between a cumulative PSD of the LCM-adjusted WSF LCMs 126 and the first cumulative PSD of the circulating WSF 122 and also minimize a mass and/or volume of the second LCM composition 121B added to the particulate-reduced WSF 124 to provide the LCM-adjusted WSF 122'. The second LCM composition 121B can be selected to minimize a difference between a cumulative PSD of the LCM-adjusted WSF LCMs 126 and the first cumulative PSD of the circulating WSF 122 and also minimize a density change of the LCM-adjusted WSF 122' relative to that of the circulating WSF 122. Accordingly, a method of this disclosure can include selecting the second LCM composition 121B to minimize the difference between the cumulative PSD of the LCM-adjusted WSF LCMs 126 and the first cumulative PSD (e.g., of the circulating WSF 122 introduced into separator 128) and also minimize the mass and/or the volume of the second LCM composition 121B added to the particulate-reduced WSF 124 to provide the LCM-adjusted WSF 122'

Figure 2:
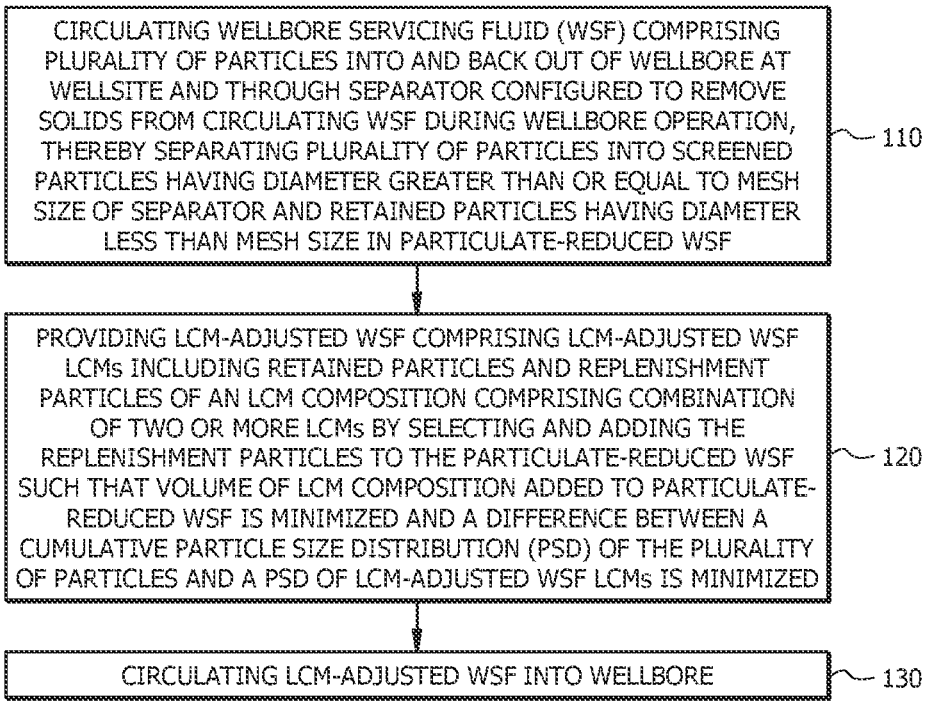
FIG. 2 is a schematic flow diagram of a method, according to one or more embodiments of this disclosure.

With reference to FIG. 2, which is a schematic flow diagram of a method IL, according to one or more embodiments of this disclosure, a method II of this disclosure can include, at 110, circulating a wellbore servicing fluid (WSF) 122 including a plurality of particles 123 into and back out of a wellbore (116, FIG. 4 described hereinbelow) at a wellsite (136, FIG. 4) and through a separator (128, FIG. 4) configured to remove solids from the circulating WSF 122 during a wellbore operation, thereby separating the plurality of particles 123 into screened particles 123A having a diameter greater than or equal to a mesh size of the separator 128, and retained particles 123B having a diameter less than the mesh size in a particulate-reduced WSF 124; at 120, providing an LCM-adjusted WSF 122' including LCM-adjusted WSF LCMs 126 including the retained particles 123B and replenishment particles 125 of an LCM composition 121B including a combination of two or more LCMs by selecting and adding the replenishment particles 125 to the particulate-reduced WSF 124, such that a volume of the LCM composition 121B added to the particulate-reduced WSF 124 is minimized and a difference between a cumulative PSD of the plurality of particles 123 and a cumulative PSD of the LCM-adjusted WSF LCMs 126 (and/or a difference between the equivalent circulating density (ECD) of the circulating WSF 122 and the ECD provided by the LCM-adjusted WSF 122') is minimized; and, at 130, circulating the LCM-adjusted WSF 122' into the wellbore (116, FIG. 4), as the circulating WSF.

The plurality of LCMs (e.g., LCM 1, LCM 2, and so on) of the second LCM composition 121B can include a combination of at least 2, 3, 4, 5, 6, 7, 8, 9, or 10 LCMs. The plurality of LCMs (e.g., LCM 1, LCM 2, and so on) of the second LCM composition 121B can include two or more LCMs selected from a plurality of available LCMs. The second LCM composition 121B can be selected by (e.g., running on a processor 138 (FIG. 4)) an algorithm to determine a combination of the two or more LCMs selected from the plurality of available LCMs to add to the particulate-reduced WSF 124 to minimize the difference between the cumulative PSD of the LCM-adjusted WSF LCMs 126 and the first cumulative PSD and also minimize the mass and/or the volume of the second LCM composition 121B added to the particulate-reduced WSF 124 to provide the LCM-adjusted WSF 122'.

The method (e.g., method I of FIG. 1, method II of FIG. 2) can be performed at a wellsite (e.g., wellsite 136 of FIG. 4, described hereinbelow), and the plurality of available LCMs (e.g., LCM 1, LCM 2, and so on) can be on location at the wellsite 136.

In embodiments, the difference between the cumulative PSD of the LCM-adjusted WSF LCMs 126 and the first cumulative PSD is less than about 10, 9, 8, 7, 6, 5, 4, 3, 2, or 1 volume percent.

Relative to the plurality of particles 123, the replenishment particles 125 of (e.g., second) LCM composition 121B can include a greater volume fraction of particles having the size greater than or equal to the mesh size of separator 128. Relative to the plurality of particles 123, the replenishment particles 125 can include a reduced volume fraction of particles having a size less than the mesh size of separator 128.

The LCMs of the first LCM composition 121A can be the same as or different from the LCMs of the second LCM composition 121B. That is, at least one or all of the one or more LCMs of the first LCM composition 121A can be present or absent in the one or the plurality of LCMs (e.g., LCM 1, LCM, 2, and so on) of the second LCM composition 121B.

The LCMs of the first LCM composition 121A and the second LCM composition 121B can include any known LCMs. For example, the one or more LCMs of the first LCM composition 121A, the one or the plurality of LCMs (e.g., LCM 1, LCM 2, etc.) of the second LCM composition 121B, or both the one or more LCMs of the first LCM composition 121A and the one or the plurality of LCMs of the second LCM composition 121B can include walnut fines, carbonate (e.g., calcium carbonate, such as BARACARB®), graphitic carbon (e.g., STEELSEAL®), or a combination thereof.

The first LCM composition 121A and the second LCM composition 121B can have different densities. An equivalent circulating density (ECD) provided by the LCM-adjusted WSF 122' can be within 1, 2, 3, 4, 5, 6, 7, 8, 9, or 10% of a desired ECD for a stage of the wellbore operation for which the LCM-adjusted WSF 122' is introduced downhole as the circulating WSF. An equivalent circulating density (ECD) provided by the LCM-adjusted WSF 122' can be within 1, 2, 3, 4, 5, 6, 7, 8, 9, or 10% of an ECD provided by the WSF 122 circulating in wellbore 116.

The method disclosed herein can further include substantially continuously or intermittently adding the volume of the (e.g., second) LCM composition 121B, such that a difference between the cumulative PSD of the LCM-adjusted WSF LCMs 126 and a desired cumulative PSD of the LCM-adjusted WSF LCMs 126 for a given stage of the wellbore operation being performed is minimized (e.g., wherein the cumulative PSD of the LCM adjusted WSF LCMs 126 is within 10, 9, 8, 7, 6, 5, 4, 3, 2, or 1% of the desired cumulative PSD (at each particle size assumed volume fraction) for the given stage of the wellbore operation. The method can include substantially continuously or intermittently adding the volume of the (e.g., second) LCM composition 121B, such that a difference between the cumulative PSD of the LCM-adjusted WSF LCMs 126 and the cumulative PSD of the first LCM composition 121A is minimized (e.g., wherein the cumulative PSD of the LCM adjusted WSF LCMs 126 is within 10, 9, 8, 7, 6, 5, 4, 3, 2, or 1% of the cumulative PSD (at each particle size) of the first LCM composition 121A.

By utilizing the method of this disclosure, an amount of dilution, concentration, or additional non-LCM materials (e.g., thickeners, viscosifiers, emulsifiers, clay inhibitors, thinners, surfactants, etc.) needed to maintain (e.g., control) a desired density (ECD) and/or rheology (e.g., viscosity) of the circulating WSF (e.g., the LCM-adjusted WSF 122') can be reduced relative to a method in which the second LCM composition 121B is the same as the first LCM composition 121A. Accordingly, management of the density and rheology (e.g., viscosity) of the WSF 122 can be facilitated via the method of this disclosure.

In embodiments, more than 2, 3, 4, 5, 6, or more circulating volumes of the circulating WSF 122 including the LCM-adjusted WSF 122' can be circulated downhole and back to the surface 107 before dilution, concentration, and/or addition of additional non-LCM materials to the circulating WSF 122/122' is needed to maintain the desired ECD, density, and/or rheology of the circulating WSF. A "circulation volume" is a volume of WSF circulating within the system. For example, for a system, such as system 100 described further hereinbelow with reference to FIG. 4, the circulation volume can include a volume of WSF circulating from mud pit 132 via pump 129 and feed pipe 133 down through drill string 108, and drill bit 114 and back up annulus 135, and back to (but not including the volume of WSF in) mud pit 132. Alternatively, the WSF can be circulated down the annulus 135, and up the drill string 108, without deviating from the scope of this disclosure.

In embodiments, the selecting of the second LCM composition 121B (e.g., at step 40 of method I of FIG. 1 or step 120 method II of FIG. 2) and the adding of the volume of the ((e.g., second) LCM composition 121B including the) replenishment particles 125 can be effected in real-time, substantially continuously or periodically. The selecting, the adding, or both the selecting and the adding can be automated. For example, the selecting can be effected by a computer program or algorithm designed to select the one or the plurality (e.g., two or more) LCMs (e.g., LCM 1, LCM 2, etc.) of the (e.g., second) LCM composition 121B from an inputted selection of available LCMs, wherein the available LCMs are LCM materials on location at the wellsite 136. The selecting can be performed via a processor, as hereinbelow described further with reference to FIG. 4.

Figure 4:
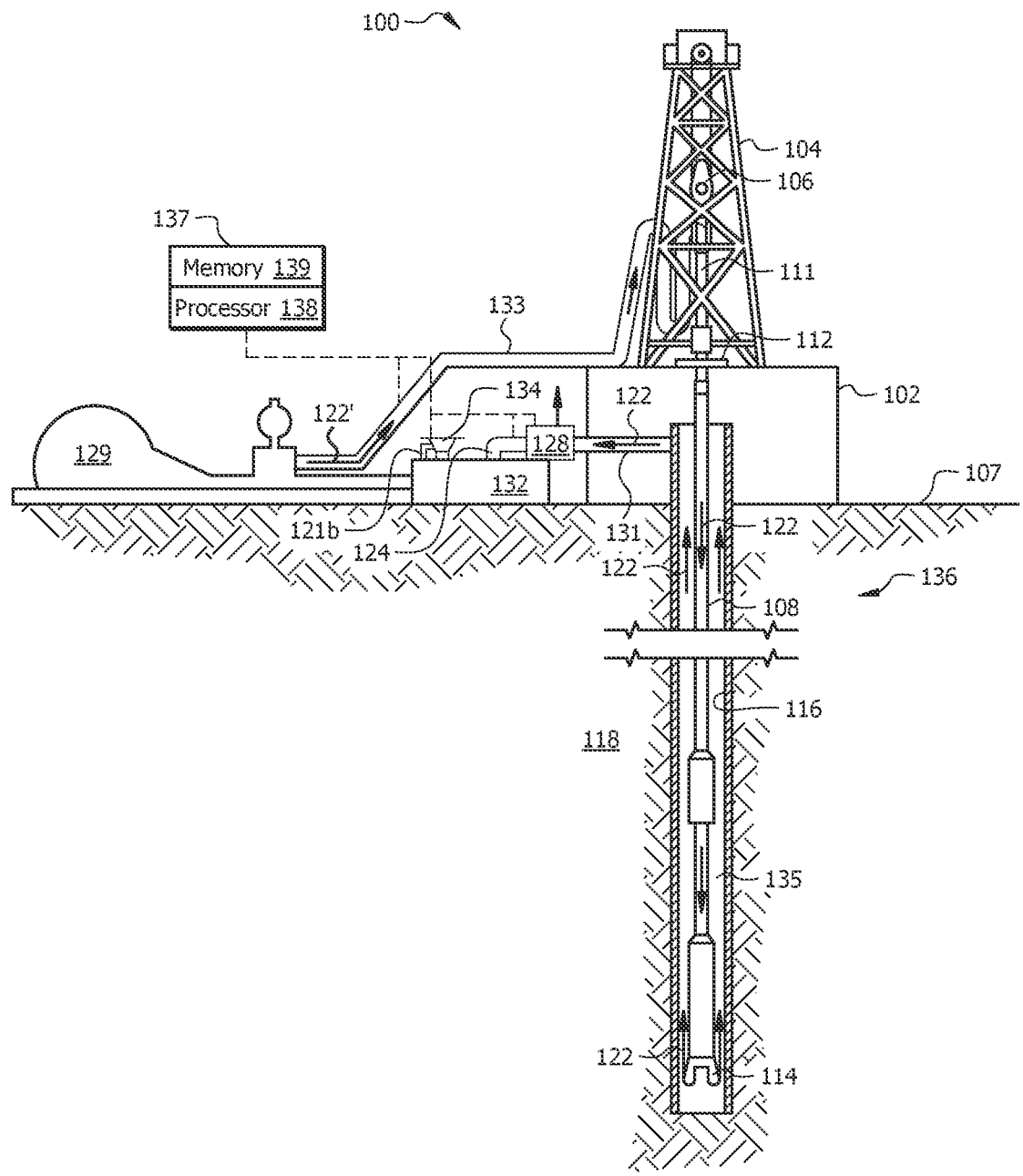
FIG. 4 is a schematic of a system, according to one or more embodiments of the this disclosure.

With reference now to FIG. 4, which is a schematic of a system 100, according to one or more embodiments of the this disclosure, some embodiments described herein may include a wellbore assembly, such as a drilling assembly 100. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure. Although referred to herein with respect to FIG. 4 as a drilling assembly and a drilling operation employing a drilling fluid WSF 122, a system and method of this disclosure can be utilized, during non-drilling wellbore servicing operations, to adjust an LCM (or other solids) composition (and cumulative PSD thereof) of circulating wellbore servicing fluids other than drilling fluids.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 111 supports the drill string 108 as it is lowered through a rotary table 112. A drill bit 114 is attached to the distal end of the drill string 108 and is driven either by a downhole motor and/or via rotation of the drill string 108 from the well surface. As the drill bit 114 rotates, it creates a wellbore 116 that penetrates various subterranean formations 118.

A pump 129 (e.g., a mud pump) circulates drilling fluid or other WSF 122 (referred to simply hereinafter with reference to FIG. 4 as a "drilling fluid 122") through a feed pipe 133 and to the kelly 111, which conveys the drilling fluid 122 downhole through the interior of the drill string 108 and through one or more orifices in the drill bit 114. The drilling fluid 122 is then circulated back to the surface via an annulus 135 defined between the drill string 108 and the walls of the wellbore 116. At the surface, the recirculated or spent drilling fluid 122 exits the annulus 135 and may be conveyed to one or more fluid processing unit(s) including separator 128 via an interconnecting flow line 131. After passing through the fluid processing unit(s) including separator 128, a "cleaned" or particulate-reduced drilling fluid WSF 124 can be deposited into a nearby retention pit 132 (i.e., a mud pit). While illustrated as being arranged at the outlet of the wellbore 116 via the annulus 135, those skilled in the art will readily appreciate that the fluid processing unit(s) or separator 128 may be arranged at any other location in the drilling assembly 100 to facilitate its proper function, without departing from the scope of the scope of the disclosure. For example, the particulate-reduced WSF 124 need not be introduced into mud pit 132, in embodiments.

The (e.g., second) LCM composition 121B including replenishment particles 125 may be added to the drilling fluid 122 via a mixing hopper 134. Hopper 134 can be communicably coupled to or otherwise in fluid communication with the retention pit 132. Alternatively, mixing hopper 134 can be configured to introduce replenishment particles 125 elsewhere in system 100. The mixing hopper 134 may include, but is not limited to, mixers and related mixing equipment known to those skilled in the art. In other embodiments, however, the replenishment particles may be added to the drilling fluid (or another circulating WSF) 122 at any other location in the drilling assembly 100. In embodiments, for example, there can be more than one retention pit 132, such as multiple retention pits 132 in series. Moreover, the retention pit 132 may be representative of one or more fluid storage facilities and/or units where the particles disclosed herein may be stored, reconditioned, and/or regulated until added to the drilling fluid 122.

The fluid processing unit(s) including separator 128 may include, but are not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) including separator 128 may further include one or more sensors, gauges, pumps, compressors, and the like used to store, monitor, regulate, and/or recondition the particles described herein.

System 100 can further include a processing apparatus 137 (e.g., a computer) including a processor 138 and a memory 139 operable to select the composition of the (second) LCM composition 121B from one or a plurality of available LCMs (e.g., LCM 1, LCM 2, LCM 3, etc., of FIG. 3).

Having described FIG. 4, a system 100 of this disclosure can thus include: a wellbore 116 in which a circulating wellbore servicing fluid (WSF) 122 including a plurality of particles 123 is circulated during a wellbore operation, a separator 128 (e.g., a shaker (e.g., shale shaker), a screen, a centrifuge, a hydrocyclone, a magnetic separator, an electrical separator, a desilter, a desander, a filter (e.g., diatomaceous earth filters), or another solids separation device) configured to remove solids from the circulating WSF 122, thereby separating the plurality of particles 123 into screened particles 123A having a diameter greater than or equal to a mesh size and retained particles 123B having a diameter less than the mesh size; a processor 138; and a memory 139 including an LCM application or model. The LCM application or model, when executed on the processor 138, configures the processor 138 to: receive data (e.g., including an initial cumulative particle size distribution (PSD) of circulating WSF 122, average specific gravity of the plurality of particles 123 of the circulating WSF and an initial composition (e.g., volume fraction of the plurality of particles) of the circulating WSF 122, the mesh size X of the separator 128), and determine a composition of replenishment particles 125 (e.g., a (second) LCM composition 121B) and volume thereof to add to the particulate-reduced WSF 124 such that the volume of the replenishment particles 125 added to the particulate-reduced WSF 124 is minimized and a difference a cumulative PSD of the replenishment particles 125 and retained particles 123B in the LCM-adjusted WSF 122' and a cumulative PSD of the plurality of particles 123 in the circulating WSF 122 (and/or a difference between an equivalent circulating density (ECD) provided by the circulating WSF 122 and an ECD provided by the LCM-adjusted WSF 122') is minimized. As noted above, the (second) LCM composition 121B includes a combination of two or more LCMs (e.g., LCM 1, LCM 2, etc., of FIG. 3).

The LCM application run on processor 138 can include an algorithm that causes the processor 138 to iteratively examine various combinations of the two or more LCMs (e.g., LCM 1, LCM 2, etc.) to arrive at the second LCM composition 121B and volume thereof. The LCM application can include a machine learning model, iterative simulation, data driven solution, or a combination thereof.

In embodiments, the LCM application iteratively simulates composition options of various available products to maintain the cumulative PSD curve to as close to the initial design as possible, while minimizing the buildup of materials that will remain in the WSF when passed through the separator 128 (e.g., shale shaker). Such an approach is flexible to a variety of wellbore situations.

In embodiments, the LCM application employs a data driven solution method to maintain the LCM. If a certain PSD design is chosen and a maintenance solution has been determined to perform well, then similar solutions may be appropriate in similar wells.

As noted above, although described and depicted in FIG. 4 as a drilling operation, the system, method, and algorithm of this disclosure can be utilized for any wellbore operation for which maintaining a desired particulate concentration in a circulating WSF subjected to solids removal is employed. For example, in embodiments, the wellbore servicing operation includes a drilling operation, a completion operation, a stimulation operation, a production operation, an enhanced recovery operation, a loss control operation, or a background operation.

The system and method of this disclosure can provide for continuous LCM additions to a WSF (e.g., mud) system that can improve ECD management, especially in narrow margin wells. In contrast to conventional practice of adding back the same LCM products utilized to initially form the WSF, which can result in very large required mass, the herein disclosed model is designed to only or primarily replace the materials that are removed by the separator (e.g., shaker screen) and thus minimize the build-up of solids that will pass through the screen (i.e., retained particles).

EXAMPLES

The embodiments having been generally described, the following examples are given as particular embodiments of the disclosure and to demonstrate the practice and advantages thereof. It is understood that the examples are given by way of illustration and not intended to limit the specification or the claims in any manner.

Comparative Example 1

As noted hereinabove, managing the additions of LCM materials that are typically used in background treatments can be challenging due to the difficulty of replenishing LCM materials that are removed by the separator (e.g., shaker screens) without adding particles that will pass through the separator (e.g., shaker screen) and thus change the mud with each replenishment. As the smaller materials build up in the fluid system, the density of the fluid may be increased with each LCM replenishment when using LCM materials like calcium carbonates having higher specific gravities. In some cases, with higher weight fluid system, the density may actually be decreased when adding LCM materials such as those made from natural fibers and nut shells having lower specific gravities.

The LCM application of this disclosure can be an algorithm or numerical model operable to predict the number of background LCM replenishments (e.g., a number of circulation volumes) that can be made before the mud weight of the wellbore servicing fluid system is out of bounds, either too high or too low, for proper ECD management. An LCM composition including the components listed in Table 1 is utilized in this Comparative Example 1.

TABLE 1

| LCM Composition of Initial WSF | | |
|---|---|---|
| LCM | SG | lb/bbl |
| Walnut Fine | 1.1 | 10 |
| BARACARB 600 | 2.6 | 10 |
| STEEL SEAL 400 | 1.8 | 20 |
| BARACARB 150 | 2.6 | 20 |

Figure 5:
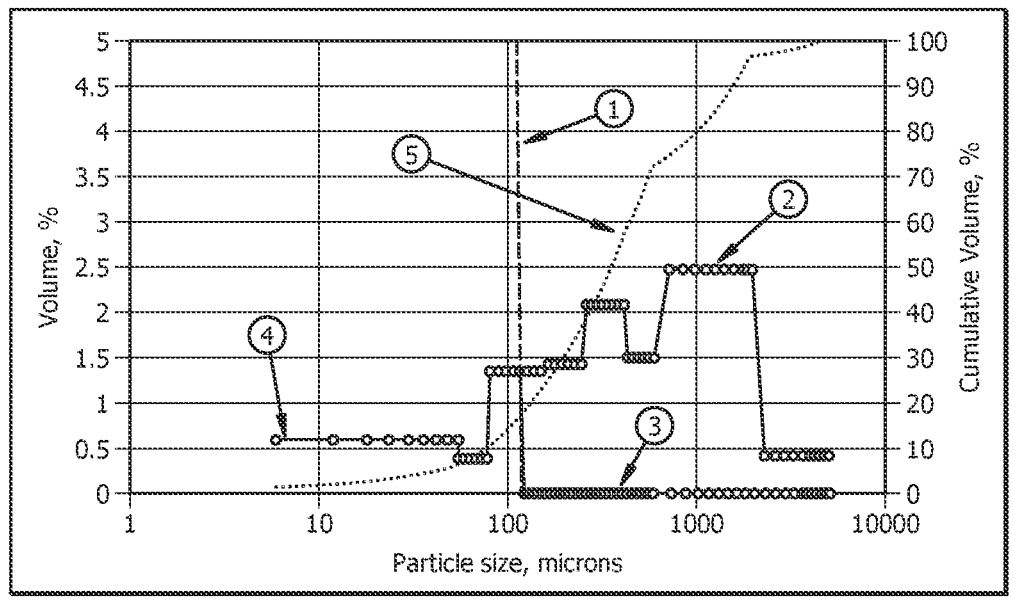
FIG. 5 is an example PSD as described in Example 1.

FIG. 5 shows an example of what happens to the larger LCM particles and the resultant PSD. The herein disclosed model allows the user select a screen mesh size (indicated at 1) that is used to remove cuttings from the drilling fluid at. Indicated at 4 is the volume of the initial LCM materials that are remaining in the fluid after the screen removes the larger particles (2) and the resultant PSD after the particles are removed, as indicated at 3. Indicated at 5 is the cumulative PSD of the initial LCM system (e.g., the initial PSD of circulating WSF 122) prior to removing any materials.

If, as conventionally done, a mud engineer were to utilize the same products to replenish the LCM, the smaller particles will continuously build up in the system. In this example with one complete circulation volume, the volume of the particles remaining in the system will increase from about 16% to 32% for this case. As can be seen, this method is undesirable and would likely require dilution coupled with the addition of many products to maintain a desired fluid density and rheology.

Example 1

Figure 6:
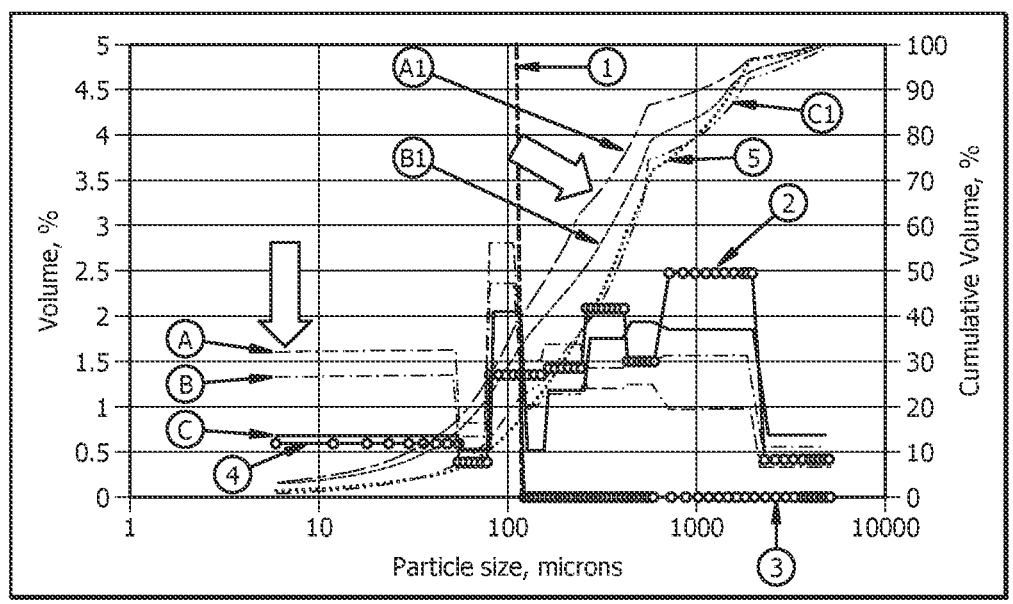
FIG. 6 is an example PSD and iterative PSDs obtained via utilization of a model according to one or more embodiments of this disclosure, as described in Example 1.

FIG. 6 shows an example optimization process overlaid upon the graph of FIG. 5, according to the method of this disclosure. The herein disclosed system and method can employ a model or algorithm to simulate the addition of any number of different LCM products (e.g., LCM 1, LCM 2, LCM 3, etc., of FIG. 3) via (second) composition 121B, with the goal of minimizing the build-up of smaller particles (e.g., less than sieve size indicated at 1) of FIG. 6. For this Example 1, three different "available" LCMs (for the one or plurality of LCMs for added (second) LCM composition 121B) were studied, the three available LCMs having the sieve results shown in Table

TABLE 2

| Available Maintenance LCMs of Example 1 | | | | | | | | |
|---|---|---|---|---|---|---|---|---|
| LCM 1 | | | LCM 2 | | | LCM 3 | | |
| US Sieve No. | μm | % Retained | US Sieve No. | μm | % Retained | US Sieve No. | μm | % Retained |
| 6 | 3350 | 0.0 | 6 | 3350 | 12.0 | 6 | 3350 | 0.0 |
| 10 | 2000 | 0.0 | 10 | 2000 | 34.0 | 10 | 2000 | 0.0 |
| 16 | 1180 | 2.9 | 16 | 1180 | 26.0 | 16 | 1180 | 20.0 |
| 25 | 710 | 7.2 | 25 | 710 | 25.0 | 25 | 710 | 15.0 |
| 40 | 425 | 30.4 | 40 | 425 | 3.0 | 40 | 425 | 40.0 |
| 50 | 300 | 44.9 | 50 | 300 | 0.0 | 50 | 300 | 20.0 |
| 60 | 250 | 14.5 | 60 | 250 | 0.0 | 60 | 250 | 5.0 |

The herein disclosed system and method utilize an LCM application, model, or strategy to determine how much of each of the available LCM products should be added as the (second) LCM composition 121B to meet the criteria detailed herein (i.e., minimize the difference between the initial PSD of the WSF 122 and the PSD of the LCM-adjusted WSF 122', while also minimizing a mass and/or volume of the added (second) LCM composition 121B (e.g., the mass and/or volume of a composition including a combination of one or a plurality of the available LCMs)). The solution is obtained by iterating through various volumes of available LCM product additions to maintain (as closely as possible based on the available LCMs) the desired PSD (e.g., the initial cumulative PSD of the circulating WSF 122), while minimizing the buildup of (retained, small) particles 123B (having a size less than the mesh size of the separator 128) indicated at (1).

During the iterative process, minimizing the product build-up of particles less than the mesh size and maintaining the initial designed/desired PSD can be simultaneously solved. By way of example of such iterations, in FIG. 6, a first shown solution is the PSD volumes at A and the corresponding cumulative PSD curve at A'. The method continues processing and searching for better combinations of the available maintenance products. At B and B', the system has lowered the buildup of smaller particles (e.g., volume percent of retained particles 123B indicated at B is less than a volume percent of retained particles 123B indicated at A) and reduced the error of the cumulative PSD curve even further (e.g., cumulative PSD curve B' better approximates initial cumulative PSD curve 5 than does cumulative PSD curve A'). The final solution is shown with C and C', in which the volume percent of retained particles 123B indicated at C is less than the volume percent of retained particles 123B indicated at A or B, and the cumulative PSD C' better approximates the initial PSD 5 than does the cumulative PSD A' or B'. Thus, for the three selected available maintenance LCM products, the buildup of particles in the mud (e.g., retained particles 123B) is only about 8% instead of the 16% that the original products would have produced. As will be apparent to those of skill in the art, other maintenance products (e.g., additional and/or alternative LCM choices beyond the available LCM 1, LCM 2, and LCM 3 shown here) can be utilized to perhaps obtain improved results. A fully equipped algorithm, LCM application, or model according to this disclosure can consider, for utilization as replenishment particles 125, all the LCM materials available at the location (e.g., at the wellsite 136).

In some embodiments the curves shown in FIG. 6 for the optimization process may include discrete curves for each available maintenance LCM product. This could provide for enhanced analysis of the resulting density increases or decreases in the fluid system.

ADDITIONAL DISCLOSURE

The following are non-limiting, specific embodiments in accordance with the present disclosure:

In a first embodiment, a method comprises: introducing a wellbore servicing fluid (WSF) downhole via a wellbore, wherein the WSF comprises a first loss circulation material (LCM) composition, wherein the first LCM composition comprises one or more LCMs and includes a plurality of particles having a first cumulative particle size distribution; circulating the WSF, as a circulating WSF, downhole and back to a surface during a wellbore operation; passing the circulating WSF through a separator configured to separate solids from the circulating WSF, thereby separating the plurality of particles into screened particles having a diameter greater than or equal to a mesh size of the separator and retained particles having a diameter less than the mesh size in a particulate-reduced WSF; adding a volume of a second LCM composition comprising replenishment particles to the particulate-reduced WSF to provide an LCM-adjusted WSF, wherein the second LCM composition comprises one or a plurality of LCMs, and wherein the LCM-adjusted WSF comprises LCM-adjusted WSF LCMs, wherein the LCM-adjusted WSF LCMs comprise the retained particles and the replenishment particles; and introducing the LCM-adjusted WSF into the wellbore and circulating the LCM-adjusted WSF, as the circulating WSF, wherein the second LCM composition is selected to minimize a difference between a cumulative PSD of the LCM-adjusted WSF LCMs and the first cumulative PSD and also minimize a mass and/or the volume of the second LCM composition added to the particulate-reduced WSF to provide the LCM-adjusted WSF.

A second embodiment can include the method of the first embodiment, wherein the plurality of LCMs comprise a combination of at least 2, 3, 4, 5, 6, 7, 8, 9, or 10 LCMs.

A third embodiment can include the method of the first or the second embodiment, wherein the plurality of LCMs comprise two or more LCMs selected from a plurality of available LCMs, and wherein the second LCM composition is selected by running an algorithm to determine a combination of the two or more LCMs selected from the plurality of available LCMs to add to the particulate-reduced WSF to minimize the difference between the cumulative PSD of the LCM-adjusted WSF LCMs and the first cumulative PSD and also minimize the mass and/or the volume of the second LCM composition added to the particulate-reduced WSF to provide the LCM-adjusted WSF.

A fourth embodiment can include the method of the third embodiment, wherein the method is performed at a wellsite, and wherein the plurality of available LCMs are on location at the wellsite.

A fifth embodiment can include the method of any one of the first to fourth embodiments, wherein the difference between the cumulative PSD of the LCM-adjusted WSF LCMs and the first cumulative PSD is less than about 10, 9, 8, 7, 6, 5, 4, 3, 2, or 1 volume percent.

A sixth embodiment can include the method of any one of the first to fifth embodiments, wherein the separator (e.g., shaker, screen or other separation device) removes solids of the circulating WSF having the size greater than or equal to the mesh size, and wherein, relative to the plurality of particles, the replenishment particles comprise a greater volume fraction of particles having the size greater than or equal to the mesh size, and, wherein, relative to the plurality of particles, the replenishment particles comprise a reduced volume fraction of particles having a size less than the mesh size.

A seventh embodiment can include the method of any one of the first to sixth embodiments, wherein at least one or all of the one or more LCMs of the first LCM composition are present or absent in the plurality of LCMs of the second LCM composition.

An eighth embodiment can include the method of any one of the first to seventh embodiments, wherein the one or more LCMs of the first LCM composition, the one or the plurality of LCMs of the second LCM composition, or both the one or more LCMs of the first LCM composition and the one or the plurality of LCMs of the second LCM composition comprise walnut fines, carbonate (e.g., calcium carbonate, such as BARACARB®), graphitic carbon (e.g., STEEL-SEAL®), or a combination thereof.

A ninth embodiment can include the method of any one of the first to eighth embodiments, wherein the first LCM composition and the second LCM composition have different densities, and/or wherein an equivalent circulating density (ECD) of the LCM-adjusted WSF is within 1, 2, 3, 4, 5, 6, 7, 8, 9, or 10% of a desired ECD for a stage of the wellbore operation for which the LCM-adjusted WSF is introduced downhole as the circulating WSF.

A tenth embodiment can include the method of any one of the first to ninth embodiments further comprising substantially continuously or intermittently adding the volume of the second LCM composition, such that a difference between the cumulative PSD of the LCM-adjusted WSF LCMs and a desired cumulative PSD of the LCM-adjusted WSF LCMs for a given stage of the wellbore operation being performed is minimized (e.g., wherein the cumulative PSD of the LCM adjusted WSF LCMs is within 10, 9, 8, 7, 6, 5, 4, 3, 2, or 1% of the desired cumulative PSD (e.g., at each particle size) for the given stage of the wellbore operation).

An eleventh embodiment can include the method of any one of the first to tenth embodiments, wherein the method reduces an amount of dilution, concentration, or additional non-LCM materials (e.g., thickeners, viscosifiers, emulsifiers, clay inhibitors, thinners, surfactants, etc.) needed to maintain a desired density (e.g., ECD) and rheology of the circulating WSF (e.g., the LCM-adjusted WSF) relative to a method in which the second LCM composition is the same as the first LCM composition.

A twelfth embodiment can include the method of the eleventh embodiment, wherein greater than 2, 3, 4, 5, 6, or more circulating volumes of the circulating WSF comprising the LCM-adjusted WSF can be circulated downhole and back to the surface before dilution, concentration, or addition of additional non-LCM materials to the circulating WSF is needed to maintain the desired ECD, density, and/or rheology of the circulating WSF.

In a thirteenth embodiment, a method comprises: circulating a wellbore servicing fluid (WSF) comprising a plurality of particles into and back out of a wellbore at a wellsite and through a separator configured to remove solids from the circulating WSF during a wellbore operation, thereby separating the plurality of particles into screened particles having a diameter greater than or equal to a mesh size of the separator, and retained particles having a diameter less than the mesh size in a particulate-reduced WSF; and providing an LCM-adjusted WSF comprising LCM-adjusted WSF LCMs including the retained particles and replenishment particles of an LCM composition comprising a combination of two or more LCMs by selecting and adding the replenishment particles to the particulate-reduced WSF such that a volume of the LCM composition added to the particulate-reduced WSF is minimized and a difference between a cumulative PSD of the plurality of particles and a PSD of the LCM-adjusted WSF LCMs (and/or a difference between the equivalent circulating density (ECD) of the circulating WSF and the ECD provided by the LCM-adjusted WSF) is minimized; and circulating the LCM-adjusted WSF into the wellbore.

A fourteenth embodiment can include the method of the thirteenth embodiment, wherein the selecting and adding are done in real-time, substantially continuously or periodically.

A fifteenth embodiment can include the method of any one of the thirteenth or fourteenth embodiments, wherein the selecting, the adding, or both the selecting and the adding are automated.

A sixteenth embodiment can include the method of the fifteenth embodiment, wherein the selecting is effected by a computer program designed to select the two or more LCMs from an inputted selection of available LCMs, wherein the available LCMs are on location at the wellsite.

In a seventeenth embodiment, a system comprises: a wellbore in which a circulating wellbore servicing fluid (WSF) comprising a plurality of particles is circulated during a wellbore operation; a separator (e.g., a shaker (e.g., shale shaker), a screen, a centrifuge, a hydrocyclone, a magnetic separator, an electrical separator, a desilter, a desander, a filter (e.g., diatomaceous earth filters), or another solids separation device) configured to remove solids from the circulating WSF, thereby separating the plurality of particles into screened particles having a diameter greater than or equal to a mesh size and retained particles having a diameter less than the mesh size in a particulate-reduced WSF; a processor; and a memory comprising an LCM application, wherein the LCM application, when executed on the processor, configures the processor to: receive data including an initial cumulative particle size distribution (PSD) and average specific gravity of the plurality of particles of the circulating WSF and an initial composition (e.g., volume fraction of the plurality of particles) of the circulating WSF, and the mesh size of the separator, and determine a composition of replenishment particles and volume thereof to add to the circulating WSF to provide an LCM-adjusted WSF, such that the volume of the replenishment particles added to the particulate-reduced WSF is minimized and a difference a cumulative PSD of the replenishment particles and retained particles in the LCM-adjusted WSF and a cumulative PSD of the plurality of particles in the circulating WSF (and/or a difference between an equivalent circulating density (ECD) of the circulating WSF and an ECD provided by the LCM-adjusted WSF) is minimized, wherein the second LCM composition comprises a combination of two or more LCMs.

An eighteenth embodiment can include the system of the seventeenth embodiment, wherein the LCM application comprises an algorithm that causes the processor to iteratively examine various combinations of the two or more LCMs to arrive at the second LCM composition and volume thereof.

A nineteenth embodiment can include the system of any one of the seventeenth or eighteenth embodiments, wherein the LCM application comprises an iterative simulation, a data driven solution, a machine learning model, or a combination thereof.

A twentieth embodiment can include the system of any one of the seventeenth to nineteenth embodiments, wherein the wellbore operation comprises as a drilling operation, a completion operation, a stimulation operation, a production operation, an enhanced recovery operation, a loss control operation, or a background treatment operation.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprising, including, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
    introducing a wellbore servicing fluid (WSF) downhole via a wellbore, wherein the WSF comprises a first loss circulation material (LCM) composition, wherein the first LCM composition comprises one or more LCMs and includes a plurality of particles having a first cumulative particle size distribution (PSD);
    circulating the WSF, as a circulating WSF, downhole and back to a surface during a wellbore operation;
    passing the circulating WSF through a separator configured to separate solids from the circulating WSF, thereby separating the plurality of particles into screened particles having a diameter greater than or equal to the mesh size and retained particles having a diameter less than the mesh size in a particulate-reduced WSF;
    adding a volume of a second LCM composition comprising replenishment particles to the particulate-reduced WSF to provide an LCM-adjusted WSF, wherein the second LCM composition comprises one or a plurality of LCMs, and wherein the LCM-adjusted WSF comprises LCM-adjusted WSF LCMs, wherein the LCM-adjusted WSF LCMs comprise the retained particles and the replenishment particles; and
    introducing the LCM-adjusted WSF into the wellbore and circulating the LCM-adjusted WSF, as the circulating WSF,
    wherein the second LCM composition is selected to minimize a difference between a cumulative PSD of the LCM-adjusted WSF LCMs and the first cumulative PSD and also minimize a mass and/or the volume of the second LCM composition added to the particulate-reduced WSF to provide the LCM-adjusted WSF.

2. The method of claim 1, wherein the plurality of LCMs comprise a combination of at least 2 LCMs.

3. The method of claim 1, wherein the plurality of LCMs comprise two or more LCMs selected from a plurality of available LCMs, and wherein the second LCM composition is selected by running an algorithm to determine a combination of the two or more LCMs selected from the plurality of available LCMs to add to the particulate-reduced WSF to minimize the difference between the cumulative PSD of the LCM-adjusted WSF LCMs and the first cumulative PSD and also minimize the mass and/or the volume of the second LCM composition added to the particulate-reduced WSF to provide the LCM-adjusted WSF.

4. The method of claim 3, wherein the method is performed at a wellsite, and wherein the plurality of available LCMs are on location at the wellsite.

5. The method of claim 1, wherein the difference between the cumulative PSD of the LCM-adjusted WSF LCMs and the first cumulative PSD is less than about 10 volume percent.

6. The method of claim 1, wherein, relative to the plurality of particles, the replenishment particles comprise a greater volume fraction of particles having the size greater than or equal to the mesh size, and, wherein, relative to the plurality of particles, the replenishment particles comprise a reduced volume fraction of particles having a size less than the mesh size.

7. The method of claim 1, wherein at least one or all of the one or more LCMs of the first LCM composition are present or absent in the plurality of LCMs of the second LCM composition.

8. The method of claim 1, wherein the one or more LCMs of the first LCM composition, the one or the plurality of LCMs of the second LCM composition, or both the one or more LCMs of the first LCM composition and the one or the plurality of LCMs of the second LCM composition comprise walnut fines, carbonate, graphitic carbon, or a combination thereof.

9. The method of claim 1, wherein the first LCM composition and the second LCM composition have different densities, and/or wherein an equivalent circulating density (ECD) of the LCM-adjusted WSF is within 10% of a desired ECD for a stage of the wellbore operation for which the LCM-adjusted WSF is introduced downhole as the circulating WSF.

10. The method of claim 1 further comprising substantially continuously or intermittently adding the volume of the second LCM composition, such that a difference between the cumulative PSD of the LCM-adjusted WSF LCMs and a desired cumulative PSD of the LCM-adjusted WSF LCMs for a given stage of the wellbore operation being performed is minimized.

11. The method of claim 1, wherein the method reduces an amount of dilution, concentration, or additional non-LCM materials needed to maintain a desired density and rheology of the circulating WSF relative to a method in which the second LCM composition is the same as the first LCM composition.

12. The method of claim 11, wherein greater than 2 or more circulating volumes of the circulating WSF comprising the LCM-adjusted WSF can be circulated downhole and back to the surface before dilution, concentration, or addition of additional non-LCM materials to the circulating WSF is needed to maintain the desired ECD, density, and/or rheology of the circulating WSF.

13. A method comprising:
- circulating a wellbore servicing fluid (WSF) comprising a plurality of particles into and back out of a wellbore at a wellsite and through a separator configured to remove solids from the circulating WSF during a wellbore operation, thereby separating the plurality of particles into screened particles having a diameter greater than or equal to a mesh size of the separator, and retained particles having a diameter less than the mesh size in a particulate-reduced WSF; and
- providing loss circulation material (LCM)-adjusted WSF comprising LCM-adjusted WSF LCMs including the retained particles and replenishment particles of an LCM composition comprising a combination of two or more LCMs by selecting and adding the replenishment particles to the particulate-reduced WSF such that a volume of the LCM composition added to the particulate-reduced WSF is minimized and a difference between a cumulative particle size distribution (PSD) of the plurality of particles and a PSD of the LCM-adjusted WSF LCMs is minimized;
- and circulating the LCM-adjusted WSF into the wellbore.

14. The method of claim 13, wherein the selecting and adding are done in real-time, substantially continuously or periodically.

15. The method of claim 13, wherein the selecting, the adding, or both the selecting and the adding are automated.

16. The method of claim 15, wherein the selecting is effected by a computer program designed to select the two or more LCMs from an inputted selection of available LCMs, wherein the available LCMs are on location at the wellsite.

17. The method of claim 3, wherein the difference between the cumulative PSD of the LCM-adjusted WSF LCMs and the first cumulative PSD is less than about 10 volume percent.

18. The method of claim 17, wherein, relative to the plurality of particles, the replenishment particles comprise a greater volume fraction of particles having the size greater than or equal to the mesh size, and, wherein, relative to the plurality of particles, the replenishment particles comprise a reduced volume fraction of particles having a size less than the mesh size.

19. The method of claim 3, wherein at least one or all of the one or more LCMs of the first LCM composition are present or absent in the plurality of LCMs of the second LCM composition.

20. The method of claim 3, wherein the method reduces an amount of dilution, concentration, or additional non-LCM materials needed to maintain a desired density and rheology of the circulating WSF relative to a method in which the second LCM composition is the same as the first LCM composition and wherein greater than 2 or more circulating volumes of the circulating WSF comprising the LCM-adjusted WSF can be circulated downhole and back to the surface before dilution, concentration, or addition of additional non-LCM materials to the circulating WSF is needed to maintain the desired ECD, density, and/or rheology of the circulating WSF.

* * * * *